US008042956B2

(12) United States Patent
Shinozaki

(10) Patent No.: US 8,042,956 B2
(45) Date of Patent: Oct. 25, 2011

(54) PROJECTOR APPARATUS, PROJECTION CONTROL METHOD AND RECORDING MEDIUM STORING PROJECTION CONTROL PROGRAM

(75) Inventor: Yoshihiko Shinozaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 446 days.

(21) Appl. No.: 12/041,774

(22) Filed: Mar. 4, 2008

(65) Prior Publication Data
US 2008/0231818 A1 Sep. 25, 2008

(30) Foreign Application Priority Data
Mar. 20, 2007 (JP) ................................. 2007-073211

(51) Int. Cl.
G03B 21/14 (2006.01)
(52) U.S. Cl. ........................................ 353/101; 353/100
(58) Field of Classification Search .................. 353/101; 359/820, 697–8, 822
See application file for complete search history.

(56) References Cited

U.S. PATENT DOCUMENTS

| 4,690,528 | A | | 9/1987 | Tanimoto et al. | |
|---|---|---|---|---|---|
| 2005/0024592 | A1 | * | 2/2005 | Eguchi | 353/30 |
| 2005/0083491 | A1 | * | 4/2005 | Suzuki et al. | 353/70 |
| 2006/0187532 | A1 | | 8/2006 | Hewlett et al. | |
| 2007/0182940 | A1 | * | 8/2007 | Asai | 353/101 |

FOREIGN PATENT DOCUMENTS

| JP | 5-103255 | A | | 4/1993 |
|---|---|---|---|---|
| JP | 2003-161869 | A | | 6/2003 |
| JP | 2003161869 | A | * | 6/2003 |
| JP | 2005-91808 | A | | 4/2005 |
| JP | 2006-163060 | A | | 6/2006 |

OTHER PUBLICATIONS

Translation of Japanese application (2003-161869A).*
Japanese Office Action dated Feb. 3, 2009 (2 pages), and English translation thereof (3 pages) issued in counterpart Japanese Application No. 2007-073211.
English language Extended European Search Report dated Jun. 16, 2008, issued in a counterpart European Application.
Japanese Office Action mailed on Oct. 20, 2009, in counterpart Japanese Patent Application No. 2007-073211, and English translation thereof.

* cited by examiner

Primary Examiner — Que T Le
Assistant Examiner — Jerry Brooks
(74) Attorney, Agent, or Firm — Holtz, Holtz, Goodman & Chick, P.C.

(57) ABSTRACT

A projector apparatus comprises a light source lamp which is inside a reflector, a projection system forming a light figure using a light from the light source lamp, projecting the formed light figure by an optical lens unit having an automatic focus function and providing the image on a projection target position, a temperature sensor detecting the temperature of the light source lamp, a temperature sensor detecting the temperature of the optical lens unit, and a control unit moving the position of a focus lens of the optical lens unit in accordance with each detection result of the temperature sensors, thereby revising an image location set by the automatic focus function.

7 Claims, 3 Drawing Sheets

FIG.2

| | +0 | +1 | +2 | +3 | +4 | +5 | +6 | +7 | +8 | +9 |
|---|---|---|---|---|---|---|---|---|---|---|
| +0 | -8 | -8 | -8 | -8 | -8 | -7 | -7 | -7 | -6 | -6 |
| +10 | -6 | -6 | -5 | -5 | -5 | -4 | -4 | -4 | -3 | -3 |
| +20 | -2 | -1 | -1 | 0 | 0 | 0 | 0 | 0 | 0 | 0 |
| +30 | 1 | 1 | 1 | 2 | 2 | 2 | 2 | 2 | 3 | 3 |
| +40 | 3 | 3 | 3 | 4 | 4 | 4 | 4 | 5 | 5 | 5 |
| +50 | 5 | 6 | 6 | 6 | 7 | 7 | 8 | 8 | 8 | 9 |
| +60 | 9 | 10 | 10 | 11 | 11 | 12 | 12 | 12 | 13 | 14 |
| +70 | 15 | 15 | 15 | 16 | 16 | 16 | 16 | 16 | 16 | 16 |
| +80 | 16 | 17 | 17 | 17 | 17 | 17 | 17 | 17 | 17 | 17 |
| +90 | 17 | 17 | 17 | 17 | 17 | 17 | 17 | 17 | 17 | 17 |

LT

PROJECTOR APPARATUS, PROJECTION CONTROL METHOD AND RECORDING MEDIUM STORING PROJECTION CONTROL PROGRAM

CROSS-REFERENCE TO RELATED APPLICATIONS

This application is based upon and claims the benefit of priority from prior Japanese Patent Application No. 2007-073211, filed Mar. 20, 2007, the entire contents of which are incorporated herein by reference.

BACKGROUND OF THE INVENTION

1. Field of the Invention

The present invention is related to a projector apparatus, a projection control method and a recording medium storing a projection control program, which are suitable for use in a projector having an automatic focus function.

2. Description of the Related Art

To date, the performance of projector apparatuses, such as a projector, has improved significantly. Among these improvements, especially the refinement of the focus is most obvious to the end user. Therefore, manufactures are taking various approaches in order to enable fine control of the focus.

Especially in a projector, since a lamp, such as a high pressure mercury lamp, which reaches an extremely high temperature, is used as a light source, the rise in the lamp temperature is apt to blur the focus.

The object of the present invention is to provide a projector apparatus, a projection control method and a recording medium storing a projection control program, which are capable of maintaining an accurate focus state at all times, by accurately revising the shift of the focus lens position caused by, for example, environmental conditions.

BRIEF SUMMARY OF THE INVENTION

According to an aspect of the present invention, a projector apparatus is provided comprising: a light source; an optical lens unit having an automatic focus function and projecting a light figure formed by using a light emitted from the light source; a first temperature detecting unit configured to detect the temperature of the optical lens unit; a second temperature detecting unit configured to detect the temperature of a part other than the optical lens unit; and a projection control unit configured to move a position of a particular lens within the optical lens unit in accordance with the detection result of the first and second temperature detecting units, and to revise an image location set by the automatic focus function.

BRIEF DESCRIPTION OF THE SEVERAL VIEWS OF THE DRAWINGS

FIG. 2 is a diagram exemplifying details of a temperature revision lookup table which is stored together with an operation program in a program memory of FIG. 1.

DETAILED DESCRIPTION OF THE INVENTION

The following embodiment explains the case of applying the present invention to a DLP (Digital Light Processing) (™) scheme projector apparatus with reference to the drawings.

Figure 1:
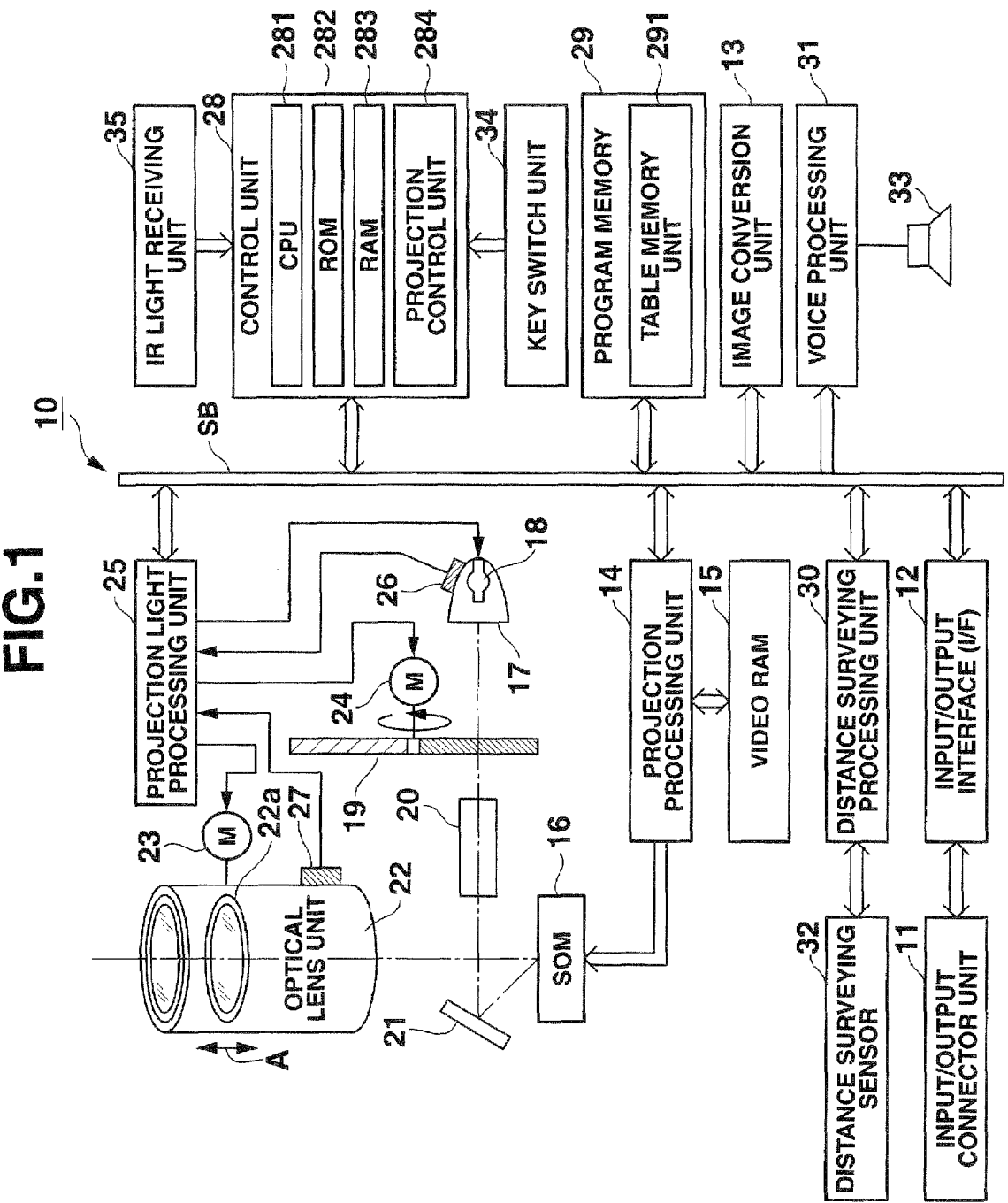
FIG. 1 is a block diagram showing a functional configuration of an electronic circuit of a projector apparatus according to an embodiment of the present invention.

FIG. 1 shows a configuration of an electronic circuit of a projector apparatus 10 according to the present embodiment. In the drawing, image signals of various standards which are input from an input/output connector unit 11 are sent to an image conversion unit 13 via an input/output interface (I/F) 12 and a system bus SB to be unified to an image signal of a predetermined format. The image signals are then sent to a projection processing unit 14.

After the projection processing unit 14 develops and stores the received image signals on a video RAM 15, the projection processing unit 14 generates a video signal from the stored contents of this video RAM 15. The projection processing unit 14 displays, for example, a micro mirror element 16, which is a space optical modification element (SOM), by a faster time-division drive, obtained by multiplying a frame rate of the video signal, such as 60 frames per second, the division number of a color component and the number of display tones.

Meanwhile, a light source lamp 18 which uses, for example, an ultrahigh pressure mercury lamp, and is arranged in a reflector 17 emits white light of high luminance. The white light emitted by the light source lamp 18 is colored to a primitive color by time division through a color wheel 19, is made into a beam of light with even luminance distribution by an integrator 20, and then is totally reflected on a mirror 21, thereby irradiating the above micro mirror element 16. A light figure is formed by the light reflected on the micro mirror element 16 and is projected and displayed via an optical lens unit 22 onto a screen, which is a projection target not illustrated in the drawing.

The optical lens unit 22 is a unit which enlarges and projects the light figure formed by the micro mirror element 16 onto a target, such as a screen. It is capable of varying a focusing position and a zoom position (field angle of projection) arbitrarily.

In particular, the focusing position is controlled by moving a focus lens 22a in the direction of an optical axis as indicated by an arrow A in the drawing. The focus lens 22a is moved by rotating a stepping motor (M) 23.

Accordingly, a projection light processing unit 25 carries out the activation of all of lighting the above light source lamp 18, spinning a motor (M) 24 which spins the above color wheel 19, and rotating the above stepping motor 23.

The projection light processing unit 25 also inputs temperature data respectively from a temperature sensor 26 (a second temperature detecting unit) which is attached to the reflector 17 and detects the temperature of the light source lamp 18, and a temperature sensor 27 (a first temperature detecting unit) which is attached to a part of an outer circumferential surface of a lens mirror tube of the optical lens unit 22 and detects the temperature of the optical lens unit 22 including the focus lens 22a.

A control unit 28 controls all operations of each of the above circuits. The control unit 28 comprises a CPU 281, a ROM 282, a RAM 283 and a projection control unit 284, and carries out control by using, for example, an operation program and various fixed data stored fixed in a program memory 29 comprised of a nonvolatile memory. The above projection control unit 284 revises an image location set by an automatic focus function by moving the above focus lens 22a.

FIG. 2 exemplifies details of a temperature revision lookup table LT (291) which is stored in the above program memory 29 along with, for example, the operation program, and is read out by the control unit 28 when necessary.

The number of anteroposterior (+/−) steps to revise the activation position of the focus lens 22a is read out from FIG. 2 based on the difference in temperatures detected respectively by the above temperature sensors 26 and 27 as mentioned below. In particular, the temperature difference value is rounded off at the decimal place, and the combination of the tens figure, which is on a vertical axis, and the units figure, which is on a horizontal axis, is read out as the number of steps.

A distance surveying processing unit 30 and a voice processing unit 31 are further connected to the control unit 28 via the system bus SB.

The distance surveying processing unit 30 controls a distance surveying sensor 32 which is comprised of two pairs of phase difference sensors arranged orthogonally and adjacent to the optical lens unit 22 on the foreface of the projector apparatus 10. The distance surveying processing unit 30 calculates the distance from these detection outputs to an arbitrary point, and sends the calculated distance value data to the control unit 28.

The voice processing unit 31 is provided with a sound source circuit, such as a PCM sound source, which converts voice data given upon projection into analogue voice data and amplifies it on a speaker 33 by driving the speaker provided on, for example, the back of the body casing of the projector apparatus 10, or generates, for example, a beeping sound according to need.

Further, with respect to the control unit 28, an operation signal is input directly from a key switch unit 34 and an IR light receiving unit 35 in accordance with the key operation of a user.

The key switch unit 34 comprises, for example, a power supply key, an AFK (Auto Focus/auto Key-stone correction) key, a zoom key, an input selection key, a cursor ("↑", "↓", "←", "→") key, and "Enter" key, and a "Cancel" key. The same key as the key switch 34 is also arranged on a remote controller, which is not shown in the drawing of the projector apparatus 10.

The IR light receiving unit 35 is arranged on the front and back surfaces of the body casing of the projector apparatus 10. The IR light receiving unit 35 demodulates an infrared modulated signal received from the remote controller (not shown in the drawing) into a code signal, and transmits the code signal to the control unit 28.

The following explains the operation of the above embodiment.

Figure 3:
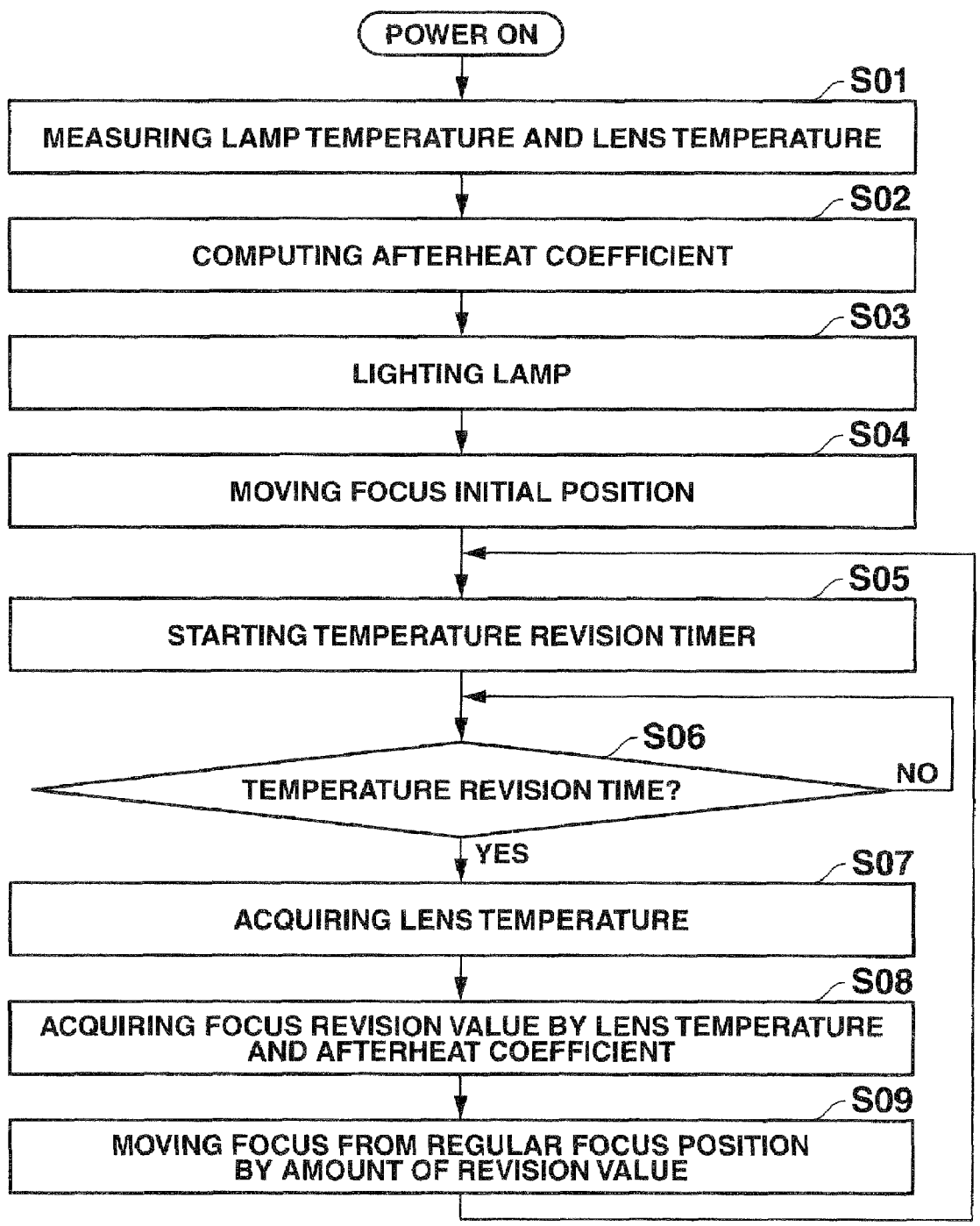
FIG. 3 is a flowchart showing processing details with regard to revising a position of a focus lens when the power is on, according to the embodiment of the same.

FIG. 3 shows the processing details of the control unit 28 revising the position of the focus lens 22a of the optical lens unit 22. The control unit 28 performs the following process constantly, in parallel with the usual projecting operation, in a state where the power of the projector apparatus 10 is kept on.

Initially, when the power is turned on, the temperature sensor 26 measures the temperature of the light source lamp 18 while the temperature sensor 27 measures the temperature of the optical lens unit 22 (step S01).

Based on the temperature TH1 of the light source lamp 18 and temperature TH2 of the optical lens unit 22 obtained by the measurements, afterheat coefficient computation is calculated using the following equation.

$$TH2-(TH1/k) \quad (1)$$

(k is a constant.)
The calculation result is maintained as an offset value OS (step S02).

Further, in the above equation (1), it is also acceptable not to consider the influence from a real coefficient k, by setting k=1.

Subsequently, the projection light processing unit 25 lights the light source lamp 18 (step S03). At the same time, the temperature revision lookup table LT in FIG. 2 is referred to in accordance with the offset value OS calculated above. Then, the number of anteroposterior (+/−) steps to revise the activation position of the focus lens 22a is read out and transmitted to the projection light processing unit 25. The projection light processing unit 25 has the stepping motor 23 move the position of the focus lens 22a by a revision value (step S04).

For instance, in the case where the projector apparatus 10 has not been used for a long time, the interior of the projector apparatus 10 is at almost the same temperature. Therefore, there is practically no difference between the temperature of the light source lamp 18 and the temperature of the optical lens unit 22, which makes the offset value OS a value close to "0 (zero)".

Meanwhile, in the case where the power of the projector apparatus 10 is turned on after being used a short while ago, there is a difference in the degree of cooling between the light source lamp 18 being a heat source, and the optical lens unit 22. Therefore, the offset value OS calculated in the step S02 becomes a large value.

The larger the offset value OS, the larger the amount of blurred focus caused by the amount of afterheat. By reading out the corresponding revision value from the temperature revision lookup table LT and moving the position of the focus lens 22a, focus can be achieved accurately on the projection target surface, which is a screen not illustrated in the drawing.

Subsequently, the control unit 28 starts timekeeping for a certain period of time, for example, for one minute, using a temperature revising timer set therein (step S05). The control unit 28 is on standby until the lapse of the set time (step S06).

Once the set time is determined to have lapsed, the temperature sensor 27 measures the temperature of the optical lens unit 22 (step S07).

The maintained offset value OS mentioned above is subtracted from the temperature TH2 of the optical lens unit 22 which was obtained by the measurement. The difference obtained thereby is set as a new offset value OS. The temperature revision lookup table LT shown in FIG. 2 is referred to in accordance with the above calculated offset value OS so as to obtain the number of anteroposterior steps as a focus revision value to revise the activation position of the focus lens 22a (step S08).

The obtained focus revision value, i.e., the number of anteroposterior steps, is transmitted to the projection light processing unit 25, and the position of the focus lens 22a is moved by an amount corresponding to the revision value (step S09).

Hereafter, by implementing the process of steps S05 to S09 in a cycle while the power is kept on, the position of the focus lens 22 is revised based on the difference in temperature between light source lamp 18 and the optical lens unit 22.

In this manner, the position of the focus lens 22a can be revised and moved, based on the temperature difference between the light source lamp 18 and the optical lens unit 22, after the power is initially turned on. Therefore, the shift in the position of focus lens 22a caused by, for example, peripheral environmental conditions can be revised accurately, thereby enabling to maintain an appropriate focus state at all times on a projection target screen.

Further, in the above embodiment, the temperature revision lookup table LT shown in FIG. 2 is stored in the program memory 29 in advance of calculating the revision value of the focus lens 22a. The revision value of the focus lens 22a is read out directly from the temperature revision lookup table LT in accordance with the difference between the temperature of the light source lamp 18 and the temperature of the optical lens unit 22.

In this manner, by storing a temperature revision lookup table LT which takes into account a structure unique to a model of the projector apparatus 10 in advance, an accurate revision value of the position of a focus lens 22a can be obtained promptly by a simple process, and furthermore, the load of the control unit 28 carrying out control processes can be reduced. The structure unique to the model of the projector apparatus 10 includes temperature characteristics caused by the relationship between the position of the light source lamp 18 and the position of the optical lens unit 22, and relationships between other structures thereabout.

In the above embodiment, the temperature of the light source lamp 18 and the optical lens unit 22 are measured. However, it is also acceptable to measure the temperature at a part other than the light source lamp 18. Further, in addition to measuring the temperature of the light source lamp 18 and the optical lens unit 22, it is also acceptable to add other places for measuring temperatures.

The above embodiment explains the case of applying the present invention to a DLP (registered trademark) scheme projector apparatus. However, this is not restricted. Therefore, as long as it is applied to a projector apparatus which has a projection optical system and is equipped with an automatic focus function, it can be applied to a liquid crystal projector apparatus which uses a transmissive color liquid crystal panel as a display element for performing projection, or a field sequential-driven liquid crystal scheme projector apparatus which transmits a primitive color light source through a monochrome liquid crystal display panel by time division.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projector apparatus comprising:
a light source;
an optical lens unit which has an automatic focus function and projects a light figure formed by using light emitted from the light source;
a first temperature detecting unit configured to detect a temperature $TH1$ of the light source;
a second temperature detecting unit configured to detect a temperature $TH2$ of the optical lens unit; and
a projection control unit configured to move a position of a particular lens within the optical lens unit in accordance with a value obtained from an afterheat coefficient computation based on the detected temperatures $TH1$ and $TH2$, so as to revise an image location set by the automatic focus function, wherein the afterheat coefficient computation is performed with an equation, $TH2-(TH1/k)$, where k is a predetermined constant.

2. A projector apparatus according to claim 1, further comprising:
a table memory unit configured to store a table which sets a revision value corresponding to a difference between the respective detection results of the first and second temperature detecting units,
wherein the projection control unit revises the image location set by the automatic focus function by calculating the difference between the respective detection results of the first and second temperature detecting units, referring to the table memory unit in accordance with the calculated difference, reading out a corresponding revision value, and moving the position of the particular lens within the optical lens unit.

3. A projector apparatus according to claim 1, wherein the second temperature detecting unit repeats the detection of the temperature $TH2$ of the optical lens unit after a certain lapse of time, while power of the projector apparatus is kept on.

4. A projection control method of a projector apparatus comprising a light source and an optical lens unit which has an automatic focus function and projects a light figure formed by using light emitted from the light source, the method comprising:
detecting a temperature $TH1$ of the light source;
detecting a temperature $TH2$ of the optical lens unit; and
moving a position of a particular lens within the optical lens unit in accordance with a value of obtained from an afterheat coefficient computation based on the detected temperatures $TH1$ and $TH2$, so as to revise an image location set by the automatic focus function, wherein the afterheat coefficient computation is performed with an equation, $TH2-(TH1/k)$, where k is a predetermined constant.

5. A projection control method according to claim 4, wherein the detection of the temperature $TH2$ of the optical lens unit is repeated after a certain lapse of time, while power of the projector apparatus is kept on.

6. A non-transitory computer-readable recording medium storing a computer-executable projection control program, wherein the program is executable by a computer in a projector apparatus comprising a light source and an optical lens unit which has an automatic focus function and projects a light figure formed by using light emitted from the light source, wherein the program is executable by the computer to control the projector apparatus to perform functions comprising:
detecting a temperature $TH1$ of the light source;
detecting a temperature $TH2$ of the optical lens unit; and
moving a position of a particular lens within the optical lens unit in accordance with a value moving a position of a particular lens within the optical lens unit in accordance with a value of obtained from an afterheat coefficient computation based on the detected temperatures $TH1$ and $TH2$, so as to revise an image location set by the automatic focus function, wherein the afterheat coefficient computation is performed with an equation, $TH2-(TH1/k)$, where k is a predetermined constant.

7. The recording medium according to claim 6, wherein the detection of the temperature $TH2$ of the optical lens unit is repeated after a certain lapse of time, while power of the projector apparatus is kept on.

* * * * *